（12） United States Patent
Devarakonda et al.

(10) Patent No.: US 12,260,229 B2
(45) Date of Patent: Mar. 25, 2025

(54) AUTOMATIC DRIFT DETECTION OF CONFIGURATIONS OF A SOFTWARE-DEFINED DATA CENTER THAT ARE MANAGED ACCORDING TO A DESIRED STATE

(71) Applicant: VMWARE, INC., Palo Alto, CA (US)

(72) Inventors: Kalyan Devarakonda, Bangalore (IN); Ivaylo Radoslavov Radev, Sofia (BG); Georgi Lyubomirov Dimitrov, Plovdiv (BG); Narasimha Gopal Gorthi, Bangalore (IN); Lipsa Nayak, Bangalore (IN)

(73) Assignee: VMware LLC, Palo Alto, CA (US)

( * ) Notice: Subject to any disclaimer, the term of this patent is extended or adjusted under 35 U.S.C. 154(b) by 113 days.

(21) Appl. No.: 18/122,162

(22) Filed: Mar. 16, 2023

(65) Prior Publication Data

US 2024/0220284 A1    Jul. 4, 2024

(30) Foreign Application Priority Data

Jan. 4, 2023   (IN) .............................. 202341000559

(51) Int. Cl.
    *G06F 9/445*        (2018.01)
(52) U.S. Cl.
    CPC ........ *G06F 9/44526* (2013.01); *G06F 9/4451* (2013.01)
(58) Field of Classification Search
    CPC .......................... G06F 9/44526; G06F 9/4451
    See application file for complete search history.

(56) References Cited

U.S. PATENT DOCUMENTS

| 11,232,091 B2* | 1/2022 | Gakhar ............... G06F 11/3051 |
| 11,424,940 B2* | 8/2022 | Pierscieniak ........... H04L 63/08 |
| 12,020,040 B2* | 6/2024 | Devarakonda ...... G06F 9/44505 |
| 12,040,942 B2* | 7/2024 | Raj ..................... H04L 41/0846 |
| 2011/0225275 A1* | 9/2011 | Shah ................... H04L 41/0816 709/223 |
| 2017/0161057 A1* | 6/2017 | Khazanchi ............... G06F 8/70 |
| 2021/0224133 A1* | 7/2021 | Barsalou ............ H04L 41/0806 |

OTHER PUBLICATIONS

Unpublished U.S. Appl. No. 17/665,602, filed Feb. 7, 2022, 24 pages.
Unpublished U.S. Appl. No. 17/711,937, filed Apr. 1, 2022, 37 pages.

* cited by examiner

*Primary Examiner* — Tammara R Peyton
(74) *Attorney, Agent, or Firm* — Kim & Stewart LLP (57) ABSTRACT

Drift is automatically detected in configuration of services running in a management appliance of a software-defined data center. A method of automatically detecting drift includes: in response to a notification of a change in a configuration of a first service enabled for proactive drift detection, transmitting a first request to compute drift in the configuration of the first service to a plug-in of the first service, the first request including the change in the configuration of the first service; periodically, at designated time intervals, transmitting a second request to compute drift in the configuration of a second service enabled for passive drift detection, to the plug-in of the second service, the second request including a current state of the configuration of the second service; and notifying a desired state management service of the computed drift in the configuration of the first and second services.

17 Claims, 7 Drawing Sheets

AUTOMATIC DRIFT DETECTION OF CONFIGURATIONS OF A SOFTWARE-DEFINED DATA CENTER THAT ARE MANAGED ACCORDING TO A DESIRED STATE

RELATED APPLICATIONS

Benefit is claimed under 35 U.S.C. 119(a)-(d) to Foreign Application Serial No. 202341000559 filed in India entitled "AUTOMATIC DRIFT DETECTION OF CONFIGURATIONS OF A SOFTWARE-DEFINED DATA CENTER THAT ARE MANAGED ACCORDING TO A DESIRED STATE", on Jan. 4, 2023, by VMware, Inc., which is herein incorporated in its entirety by reference for all purposes.

BACKGROUND

In a software-defined data center (SDDC), virtual infrastructure, which includes virtual machines (VMs) and virtualized storage and networking resources, is provisioned from hardware infrastructure that includes a plurality of host computers (hereinafter also referred to simply as "hosts"), storage devices, and networking devices. The provisioning of the virtual infrastructure is carried out by SDDC management software that is deployed on management appliances, such as a VMware vCenter Server® appliance and a VMware NSX® appliance, from VMware, Inc. The SDDC management software communicates with virtualization software (e.g., a hypervisor) installed in the hosts to manage the virtual infrastructure.

It has become common for multiple SDDCs to be deployed across multiple clusters of hosts. Each cluster is a group of hosts that are managed together by the management software to provide cluster-level functions, such as load balancing across the cluster through VM migration between the hosts, distributed power management, dynamic VM placement according to affinity and anti-affinity rules, and high availability (HA). The management software also manages a shared storage device to provision storage resources for the cluster from the shared storage device, and a software-defined network through which the VMs communicate with each other. For some customers, their SDDCs are deployed across different geographical regions, and may even be deployed in a hybrid manner, e.g., on-premise, in a public cloud, and/or as a service. "SDDCs deployed on-premise" means that the SDDCs are provisioned in a private data center that is controlled by a particular organization. "SDDCs deployed in a public cloud" means that SDDCs of a particular organization are provisioned in a public data center along with SDDCs of other organizations. "SDDCs deployed as a service" means that the SDDCs are provided to the organization as a service on a subscription basis. As a result, the organization does not have to carry out management operations on the SDDC, such as configuration, upgrading, and patching, and the availability of the SDDCs is provided according to the service level agreement of the subscription.

As described in U.S. patent application Ser. No. 17/665, 602, filed on Feb. 7, 2022, the entire contents of which are incorporated by reference herein, the desired state of the SDDC, which includes configuration of services running in management appliances of the SDDC, may be defined in a declarative document, and the SDDC is deployed or upgraded according to the desired state defined in the declarative document. In addition, if drift from the desired state is detected, the SDDC is remediated according to the desired state defined in the declarative document.

In U.S. patent application Ser. No. 17/665,602, drift detection is carried out in response to a compliance check that is initiated by a customer from a cloud platform that communicates with multiple SDDCs of the customer that may be deployed across different geographical regions, and deployed in a hybrid manner, e.g., on-premise, in a public cloud, or as a service. The configuration of the SDDCs do not undergo frequent changes so normally drift is not detected when the compliance checks are carried out. However, the compliance checks will need to be carried out on a regular basis to timely detect drifts when they do occur. As a result, compliance checks carried out for the purpose of detecting drift can be computationally expensive. Reducing the frequency of compliance checks will lower the computational cost but it will also result in delays in detecting drift.

SUMMARY

One or more embodiments provide techniques for automatically detecting drift from a desired state of configurations of an SDDC. In one embodiment, drift is automatically detected in configuration of services running in a management appliance of the SDDC, the services including a first service that is enabled for proactive drift detection and a second service that is enabled for passive drift detection. A method of automatically detecting drift according to one embodiment includes the steps of: in response to a notification of a change in a configuration of the first service, transmitting a first request to compute drift in the configuration of the first service to a plug-in of the first service, the first request including the change in the configuration of the first service; periodically, at designated time intervals, transmitting a second request to compute drift in the configuration of the second service to the plug-in of the second service, the second request including a current state of the configuration of the second service; and notifying a desired state management service of the computed drift in the configuration of the first and second services.

Further embodiments include a non-transitory computer-readable storage medium comprising instructions that cause a computer system to carry out the above method, as well as a computer system configured to carry out the above method.

DETAILED DESCRIPTION

In one or more embodiments, a cloud platform delivers various services (referred to herein as "cloud services") to the SDDCs through agents of the cloud services that are running in an appliance (referred to herein as a "agent platform appliance"). The cloud platform is a computing platform that hosts containers or virtual machines corresponding to the cloud services that are delivered from the cloud platform. The agent platform appliance is deployed in the same customer environment as the management appliances of the SDDCs.

In the embodiments described herein, the cloud platform is provisioned in a public cloud and the agent platform appliance is provisioned as a virtual machine, and the two are connected over a public network, such as the Internet. In addition, the agent platform appliance and the management appliances are connected to each other over a private physical network, e.g., a local area network. Examples of cloud services that are delivered include an SDDC configuration service, an SDDC upgrade service, an SDDC monitoring service, an SDDC inventory service, and a message broker service. Each of these cloud services has a corresponding agent deployed on the agent platform appliance. All communication between the cloud services and the management software of the SDDCs is carried out through the respective agents of the cloud services.

As described in U.S. patent application Ser. No. 17/665,602, the desired state of SDDCs of a particular organization is managed by the SDDC configuration service running in the cloud platform (e.g., configuration service 110 depicted in FIG. 2). The creation of the desired state may be sourced in accordance with techniques described in U.S. patent application Ser. No. 17/711,937, filed Apr. 1, 2022, the entire contents of which are incorporated by reference herein. Once the desired state is created, it serves as a reference point when monitoring for drift, and this in-turn enables troubleshooting and remediation actions to be carried out to eliminate the drift. Eliminating drift may be needed to enforce organization policies, comply with service level agreements, and enable delivery of certain other cloud services, such as upgrade, which require all of the SDDCs managed by an organization to be at the same desired state.

Figure 1:
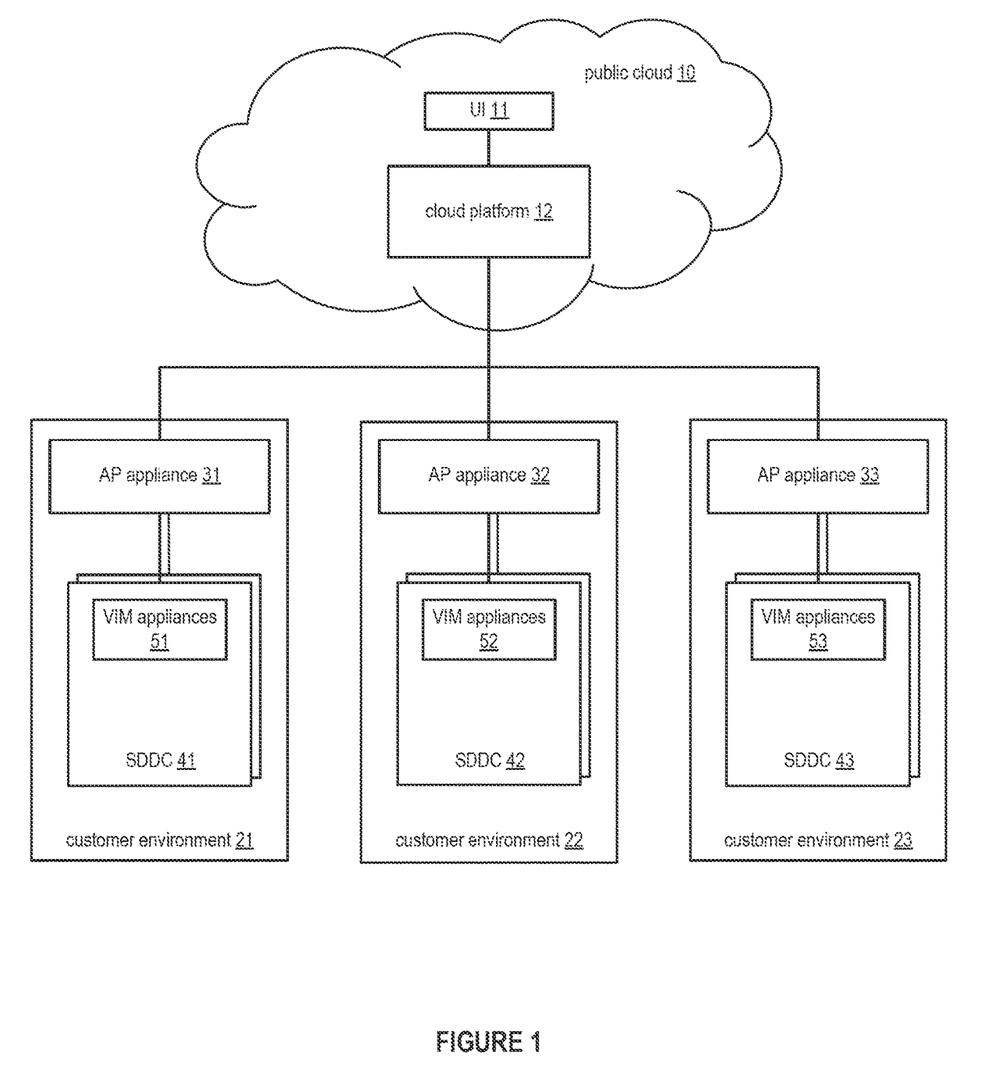
FIG. 1 is a conceptual block diagram of customer environments of different organizations that are managed through a multi-tenant cloud platform.

FIG. 1 is a conceptual block diagram of customer environments of different organizations (hereinafter also referred to as "customers" or "tenants") that are managed through a multi-tenant cloud platform 12, which is implemented in a public cloud 10. A user interface (UI) or an application programming interface (API) that interacts with cloud platform 12 is depicted in FIG. 1 as UI 11.

A plurality of SDDCs is depicted in FIG. 1 in each of customer environment 21, customer environment 22, and customer environment 23. In each customer environment, the SDDCs are managed by respective virtual infrastructure management (VIM) appliances, e.g., VMware vCenter® server appliance and VMware NSX® server appliance. For example, SDDC 41 of the first customer is managed by VIM appliances 51, SDDC 42 of the second customer by VIM appliances 52, and SDDC 43 of the third customer by VIM appliances 53.

The VIM appliances in each customer environment communicate with an agent platform (AP) appliance, which hosts agents (not shown in FIG. 1) that communicate with cloud platform 12, e.g., via a public network such as the Internet, to deliver cloud services to the corresponding customer environment. For example, the VIM appliances for managing the SDDCs in customer environment 21 communicate with AP appliance 31. Similarly, the VIM appliances for managing the SDDCs in customer environment 22 communicate with AP appliance 32, and the VIM appliances for managing the SDDCs in customer environment 23 communicate with AP appliance 33.

As used herein, a "customer environment" means one or more private data centers managed by the customer, which is commonly referred to as "on-prem," a private cloud managed by the customer, a public cloud managed for the customer by another organization, or any combination of these. In addition, the SDDCs of any one customer may be deployed in a hybrid manner, e.g., on-premise, in a public cloud, or as a service, and across different geographical regions.

In the embodiments described herein, each of the agent platform appliances and the management appliances is a VM instantiated on one or more physical host computers (not shown in FIG. 1) having a conventional hardware platform that includes one or more CPUs, system memory (e.g., static and/or dynamic random access memory), one or more network interface controllers, and a storage interface such as a host bus adapter for connection to a storage area network and/or a local storage device, such as a hard disk drive or a solid state drive. Within a particular customer environment, the one or more physical host computers on which the agent platform appliance and the management appliances are deployed as VMs belong to the same cluster, which is commonly referred to as a management cluster. In some embodiments, any of the agent platform appliances and the management appliances may be implemented as a physical host computer having the conventional hardware platform described above.

Figure 2:
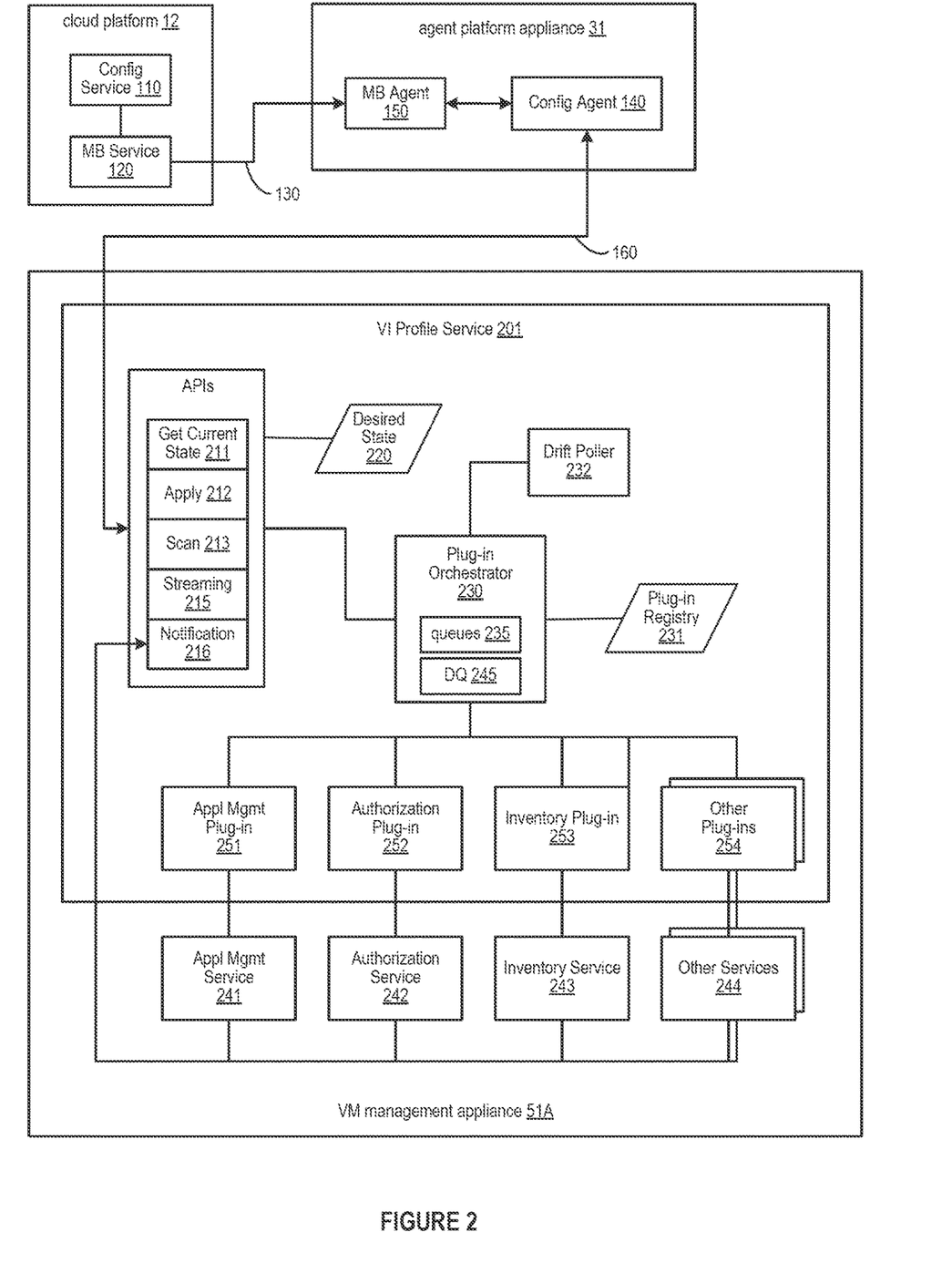
FIG. 2 illustrates components of a management appliance of an SDDC that are involved in automatically detecting and reporting drift in configuration of services running in the management appliance.

FIG. 2 illustrates components of a management appliance 51A of SDDC 41 that are involved in automatically detecting and reporting drift in configuration of services running in management appliance 51A. In the embodiments described herein, the services running in management appliance 51A include an appliance management service 241 that provides system-level services such as SSH (secure shell), resource utilization monitoring, changing various configurations including network configurations, host name NTP (network time protocol) server name, keyboard layout, and applying patches and updates, an authorization service 242 that is invoked to perform role-based access control to inventory items of SDDC 41, an inventory service 243 that is invoked to create and delete inventory items of SDDC 41, and various other services 244. Each of these services has corresponding plug-ins, namely an appliance management service plug-in 251, an authorization service plug-in 252, an inventory service plug-in 253, and various other plug-ins 254. As described below in conjunction with FIG. 3, the plug-ins are registered with virtual infrastructure (VI) profile service 201 when VI profile service 201 is launched.

Virtual infrastructure (VI) profile service 201 is the component in management appliance 51A that manages the configuration of services running in management appliance 51A according to a desired state. These services are referred to hereinafter as "managed services" and the desired state of these services are defined in a desired state document (depicted in FIG. 2 as desired state 220) that contains the desired state of the entire SDDC 41. In the embodiments described herein, the configuration of each of these services is made up of a plurality of properties and associated values, and one or more of these properties and associated values are specified in the desired state document as the desired state thereof. For example, the configuration of appliance management service 241 may include the following properties among others: (1) whether SSH is enabled or disabled; (2) host name; (3) NTP server name; and (4) keyboard layout, and only a subset of these properties, e.g., properties (1), (2), and (4), and their associated values are specified in the desired state document.

VI profile service 201 exposes various APIs that are invoked by configuration agent 140 and the managed services. The APIs include a get-current-state API 211 that is invoked by configuration agent 140 to get the current state of SDDC 41, an apply API 212 that is invoked by configuration agent 140 to apply the desired state of SDDC 41 that is defined in a desired state document to SDDC 41, scan API 213 that is invoked by configuration agent 140 to compute drift in the current state of SDDC 41 from the desired state of SDDC 41, a streaming API 215 that provides an interface for configuration agent 140 by which configuration agent 140 receives streaming updates (including any drift detected in the current state of SDDC 41 from the desired state of SDDC 41) from VI profile service 201, and a notification API 216 that is invoked by any of the managed services to notify VI profile service 201 of a change in the configuration thereof. In the embodiments described herein, each of the managed services maintains the state of its configuration, detects any change to its configuration, and notifies VI profile service 201 through notification API 216 upon detecting any change in its configuration. Each of the managed services employs a notification technique, such as long-poll, HTTP SSE (Server Sent Events), HTTP2 streaming, and webhooks, to notify VI profile service 201 through notification API 216 upon detecting any change in its configuration. In addition, instead of a streaming API 215, VI profile service 201 may implement long-poll, HTTP SSE, HTTP2 streaming, or webhooks to notify configuration agent 140 of the updates including any drift detected in the current state of SDDC 41 from the desired state of SDDC 41.

VI profile service 201 includes a plug-in orchestrator 230 that refers to a plug-in registry 231 that contains information about each of the plug-ins including: (1) process IDs of the plug-in and the corresponding service; (2) whether or not the corresponding service is enabled for proactive drift detection, passive drift detection, or both; and (3) parameters for proactive drift detection and/or passive drift detection.

Parameters for proactive drift detection specify whether or not a queue is to be set up for each of the managed services that are enabled for proactive drift detection. These queues are depicted in FIG. 2 as queues 235 and are used to throttle incoming notifications from the managed services. As will be described below, for a managed service for which no queue is set up, VI profile service 201 will compute drift in the configuration of the managed service immediately upon receiving the notification of change from the managed service. For a managed service for which a queue is set up, parameters for proactive drift detection include a throttling interval, i.e., the time interval between drift computations.

Parameters for passive drift detection include a polling interval (or alternatively, minimum gap between polling) for each of the managed services that are enabled for passive drift detection. For passive drift detection, plug-in orchestrator 230 relies on drift poller 232 to provide a periodic trigger for drift computation. Drift poller 232 maintains a separate polling interval (or alternatively, minimum gap between polling) for each of the managed services that are enabled for passive drift detection.

Figure 3:
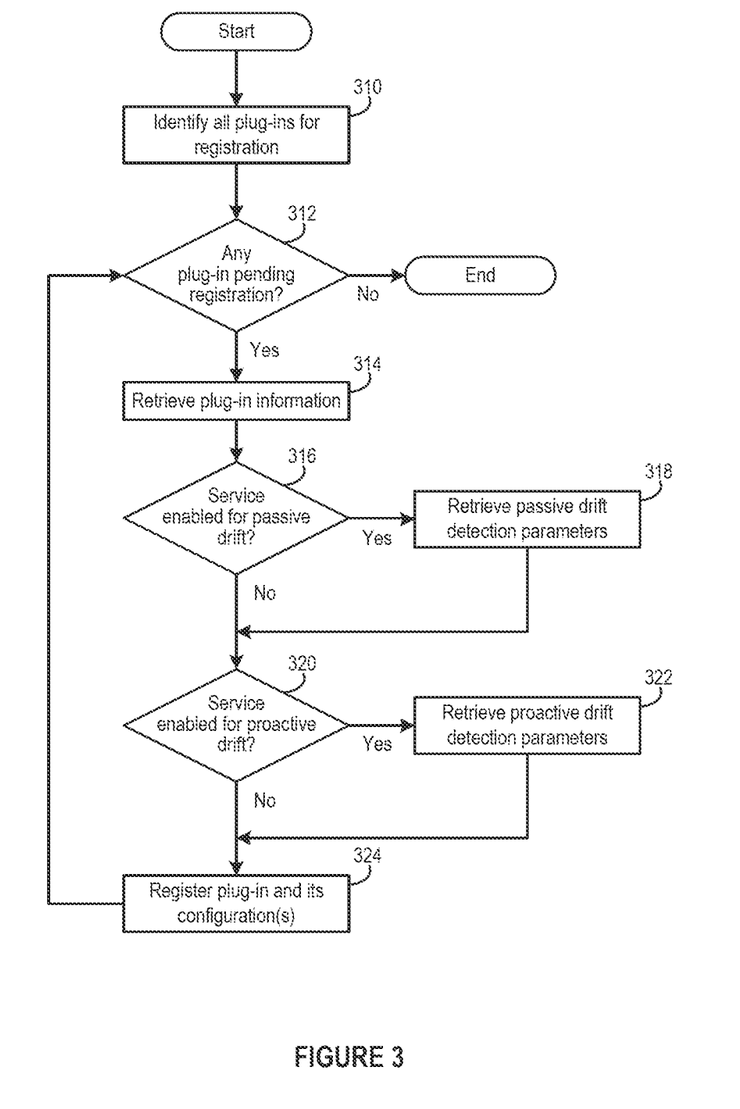
FIG. 3 is a flow diagram that depicts a method of registering plug-ins of the services running in the management appliance that are configured to compute drift in the configuration of the services.

FIG. 3 is a flow diagram that depicts a method of registering the plug-ins of the managed services. The method of FIG. 3 is carried out by plug-in orchestrator 230 and begins at step 310 when VI profile service 201 is launched. At step 310, plug-in orchestrator 230 refers to plug-in registry 231 to identify all plug-ins for registration and loops through the steps after step 312 to register each identified plug-in. At step 314, plug-in orchestrator 230 retrieves the plug-in information from plug-in registry 231 and determines whether the corresponding service is enabled for passive drift detection or proactive drift detection. If the corresponding service is enabled for passive drift detection (Step 316, Yes), plug-in orchestrator 230 retrieves the parameters for passive drift detection at step 318. The parameters for passive drift detection include the polling interval (or alternatively, the minimum gap between polling). If the corresponding service is enabled for proactive drift detection (Step 320, Yes), plug-in orchestrator 230 retrieves the parameters for proactive drift detection at step 322. The parameters for proactive drift detection include the throttling interval (where a throttling interval equal to zero would indicate that no queue is to be set up and a throttling interval greater than zero would indicate that a queue having the positive value throttling interval is to be set up). After retrieving the parameters in step 318 or step 322 or both, plug-in orchestrator 230 registers the plug-in and the parameters of drift detection at step 324.

Figure 4:
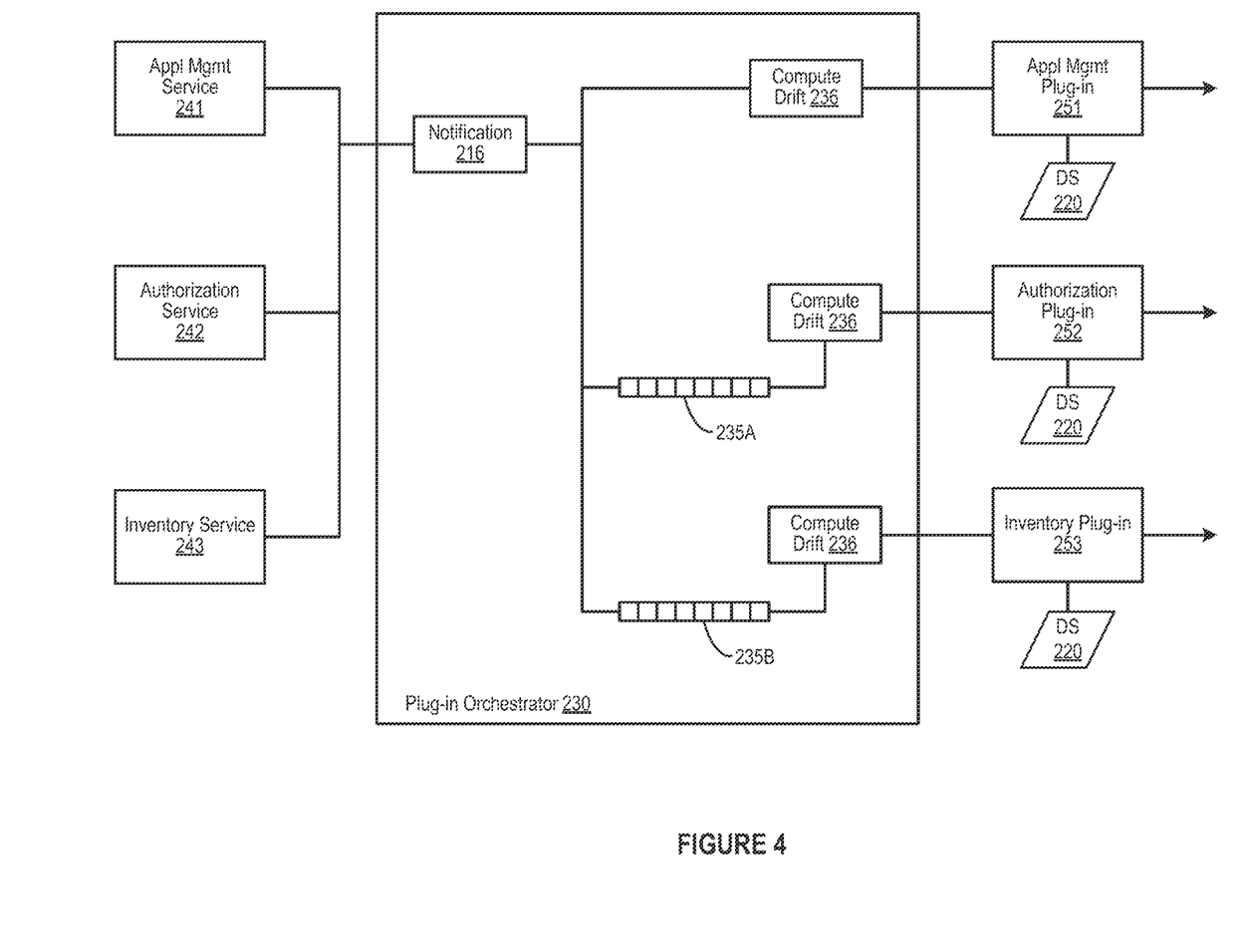
FIG. 4 is a conceptual block diagram that depicts proactive drift detection carried out by components of the management appliance.

FIG. 4 is a conceptual block diagram that depicts proactive drift detection carried out by components of management appliance 51A. In the example depicted in FIG. 4, each of appliance management service 241, authorization service 242, and inventory service 243 is enabled for proactive drift detection. Upon detecting any change in their configurations, these services report the change by invoking notification API 216. In the embodiments described herein, each change reported by the services through notification API 216 includes a key-value pair, where the key identifies the property of the configuration that has changed and the value contains the changed value. In response to notification API 216 being invoked, plug-in orchestrator 230 either stores the reported change in a queue of the respective service (as in the case of authorization service 242 and inventory service 243) or immediately issues a compute drift command 236 along with the reported change to the plug-in of the respective service (as in the case of appliance management service 241). When the reported change is queued (e.g., in either queue 235A or queue 235B), plug-in orchestrator 230 issues compute drift command 236 along with one or more changes that are stored in and retrieved from the queue according to the throttling interval that has been registered for the respective service.

Upon receipt of compute drift command 236 from plug-in orchestrator 230, each of the plug-ins performs the drift computation by comparing the change(s) included in compute drift command 236 with desired state 220. In particular, the comparison is between a changed value of each property specified in the change(s) and a value of the corresponding property specified in desired state 220. The drift computed by each of the plug-ins is reported back to plug-in orchestrator 230 and plug-in orchestrator 230 streams the computed drift to configuration agent 140 through streaming API 215. Thereafter, configuration agent 140 reports the computed drift to configuration service 110 running in cloud platform 12 through a message fabric that includes a message broker agent 150 and a message broker service 120.

Figure 5:
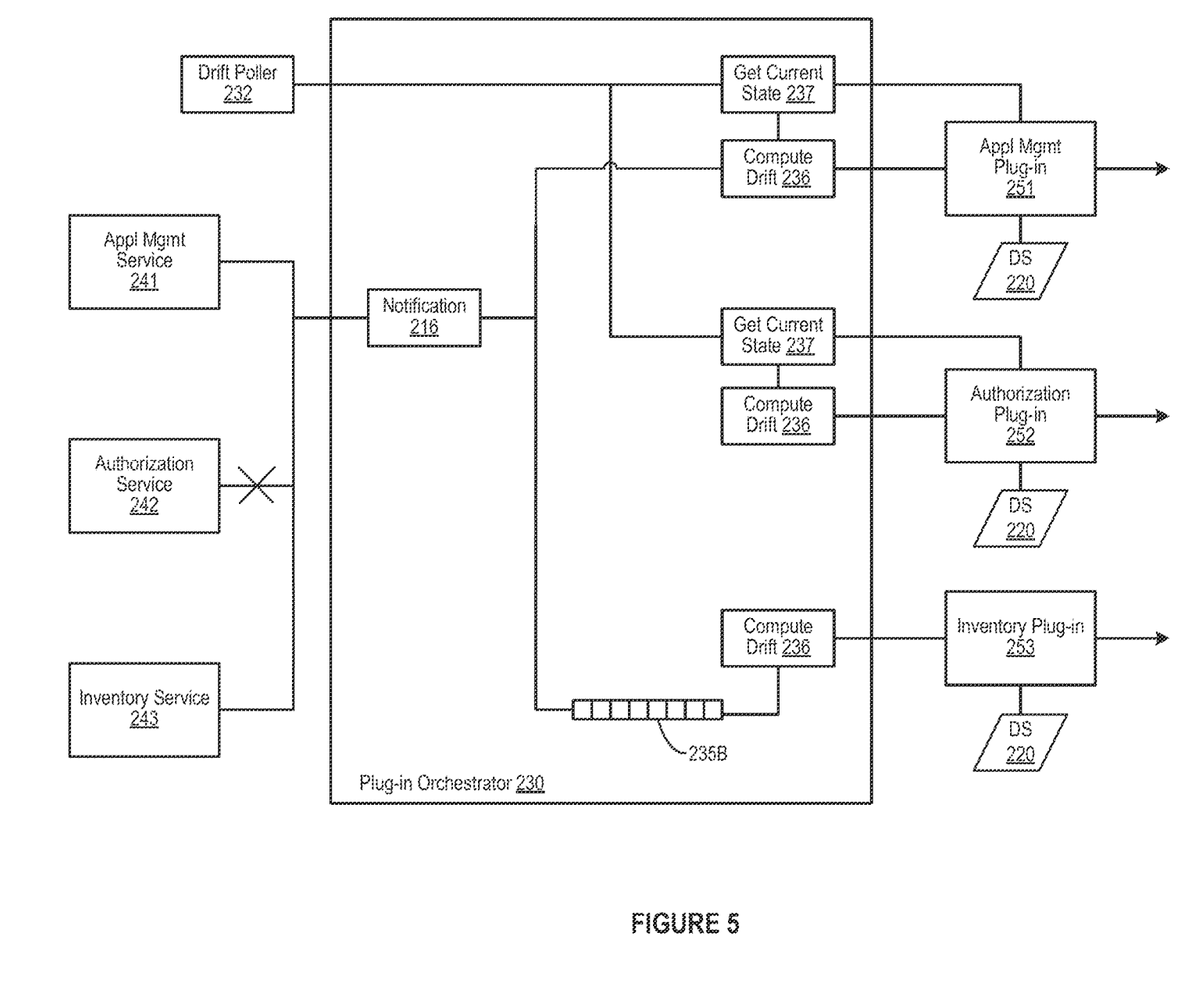
FIG. 5 is a conceptual block diagram that depicts proactive drift detection and passive drift detection carried out by components of the management appliance.

FIG. 5 is a conceptual block diagram that depicts proactive drift detection and passive drift detection carried out by components of management appliance 51A. In the example depicted in FIG. 5, appliance management service 241 is enabled for both proactive drift detection and passive drift detection, authorization service 242 for only passive drift detection, and inventory service 243 only for proactive drift detection. Because authorization service 242 is not enabled for proactive drift detection, it does not invoke notification API 216 and thus the path between authorization service 242 and notification API 216 is marked with an X. On the other hand, appliance management service 241 and inventory service 243 are enabled for proactive drift detection. It is assumed that the parameters for proactive drift detection for appliance management service 241 and inventory service 243 are the same as in the example of FIG. 4 and thus proactive drift detection for appliance management service 241 and inventory service 243 are carried out in the same manner as described above in conjunction with FIG. 4.

Passive drift detection for each of appliance management service 241 and authorization service 242 is triggered by drift poller 232 in accordance with the polling interval (or alternatively, the minimum gap between polling) defined in their respective parameters for passive drift detection. In response to the trigger from the drift poller 232, plug-in orchestrator 230 issues a get-current-state command 237 to the respective plug-in, which acquires the current state from its corresponding service and returns the current state to plug-in orchestrator 230. After acquiring the current state, plug-in orchestrator 230 issues a compute drift command 236 along with the acquired current state to the respective plug-in. The current state of a service includes all properties and associated values that make up the current configuration of the service regardless of whether the values associated with the properties changed or not.

Upon receipt of compute drift command 236 from plug-in orchestrator 230, each of the plug-ins performs the drift computation by comparing the current state included in compute drift command 236 with desired state 220. In particular, the comparison is between a value of each property specified in the current state and a value of the corresponding property specified in desired state 220. The drift computed by each of the plug-ins is reported back to plug-in orchestrator 230 and plug-in orchestrator 230 reports the computed drift to configuration agent 140 through streaming API 215. Thereafter, configuration agent 140 reports the computed drift to configuration service 110 running in cloud platform 12 through the message fabric that includes message broker agent 150 and message broker service 120.

Figure 6A:
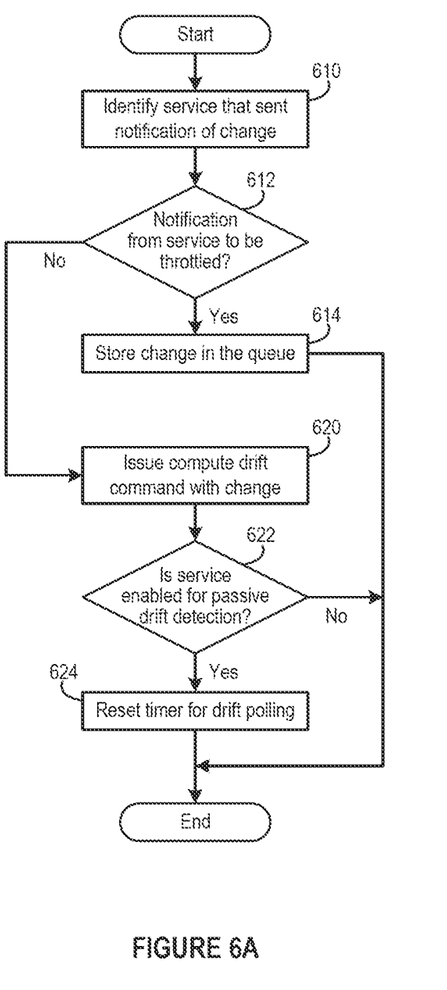
FIGS. 6A and 6B are flow diagrams that depicts a method carried out in the management appliance to compute drift in response to a notification of a change in configuration received from a service running in the management appliance.
Figure 6B:
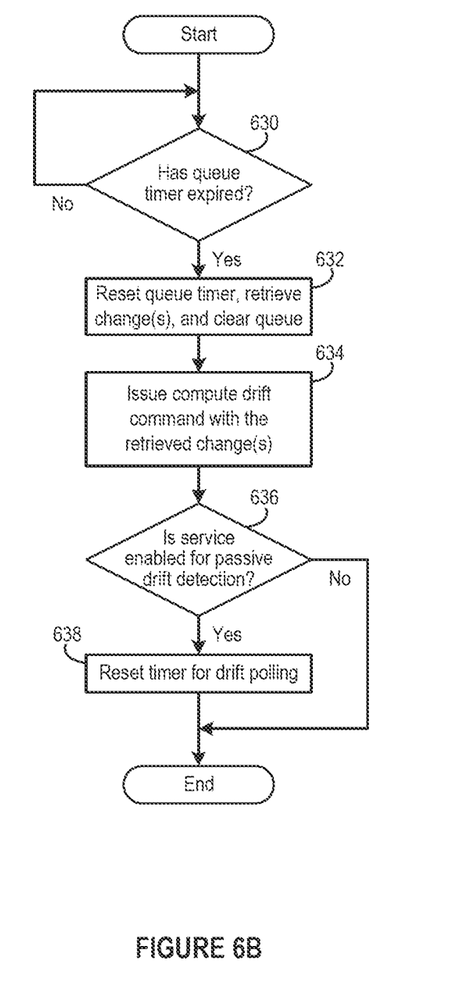

FIGS. 6A and 6B are flow diagrams that depict a method carried out in management appliance 51A to compute drift in response to a notification of a change in configuration received from a service running in the management appliance. The method of FIG. 6A is triggered when the notification of change is sent by the service. At step 610, plug-in orchestrator 230 identifies the service, which sent the notification of change in its configuration by invoking notification API 216. Then, at step 612, plug-in orchestrator 230 checks plug-in registry 231 to determine if the notifications from the service are to be throttled, i.e., throttling interval>0. If so (step 612, Yes), plug-in orchestrator 230 at step 614 stores the change in a queue for the service and the method ends thereafter. In such a case, plug-in orchestrator 230 waits for expiration of a timer associated with this queue, which is initialized with the throttling interval and activated when a change is first added to the queue. Upon expiration of the timer, plug-in orchestrator 230 executes the method of FIG. 6B.

Returning to step 612, if it is determined that the notifications from the service are not to be throttled, i.e., throttling interval=0, plug-in orchestrator 230 immediately issues compute drift command 236 (to the plug-in of the service that sent the notification of change) with the change reported by the service at step 620. After step 620, plug-in orchestrator 230 checks plug-in registry 231 at step 622 to determine if the service is also enabled for passive drift detection. If so (step 622, Yes), plug-in orchestrator 230 at step 624 resets the timer for drift polling with the polling interval (which is defined in the parameters for passive drift detection for the service) and the method ends thereafter. If not (step 622, No), the method ends without executing step 624.

The method of FIG. 6B is triggered when a timer of a queue for a particular service (e.g., one of queues 235) expires, which is determined at step 630. Upon expiration of the timer, plug-in orchestrator 230 at step 632 resets the timer, retrieves the changes from the queue, and clears the queue. Then, at step 634, plug-in orchestrator 230 issues compute drift command 236 (to the plug-in of the service whose queue timer expired) with the retrieved changes. If there are changes to the same property of the configuration stored in the queue, plug-in orchestrator 230 retains only the most recent change to the property. After step 634, plug-in orchestrator 230 checks plug-in registry 231 at step 636 to determine if the service the service whose queue timer expired is also enabled for passive drift detection. If so (step 636, Yes), plug-in orchestrator 230 at step 638 resets the timer for drift polling with the polling interval (which is defined in the parameters for passive drift detection for the service) and the method ends thereafter. If not (step 636, No), the method ends without executing step 638.

Figure 7:
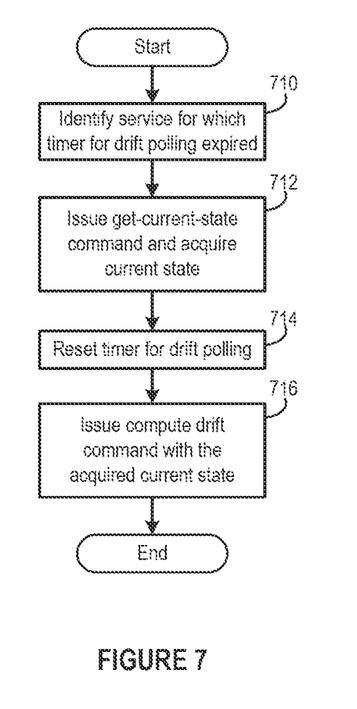
FIG. 7 is a flow diagram that depicts a method carried out in the management appliance to compute drift in response to a periodic trigger.

FIG. 7 is a flow diagram that depicts a method carried out in management appliance 51A to compute drift in response to a periodic trigger from drift poller 232. The method of FIG. 7 begins at step 710 at which plug-in orchestrator 230 identifies the service for which the timer for drift polling (which is initialized with the polling interval defined in the parameters for passive drift detection for the service) expired. Then, at step 712, plug-in orchestrator 230 issues a get-current-state command 237 to the respective plug-in for the service and acquires the current state of the service from the plug-in. Upon acquiring the current state of the service from the plug-in, plug-in orchestrator 230 at step 714 resets the timer for drift polling for the service (with the polling interval defined in the parameters for passive drift detection for the service) and at step 716, issues compute drift command 236 with the acquired current state.

In the above methods, in response to the compute drift command, the plug-in computes the drift and returns the computed drift to plug-in orchestrator 230. In turn, plug-in orchestrator 230 may immediately report the computed drift to the streaming API client, e.g., configuration agent 140, or throttle the reporting of the computed drift by storing the computed drift in a queue (hereinafter referred to as a "drift queue" and shown in FIG. 2 as DQ 245), as depicted in the methods of FIGS. 8A and 8B.

Figure 8A:
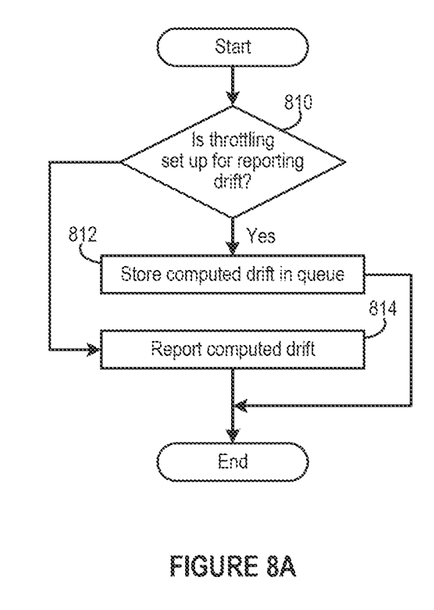
FIGS. 8A and 8B are flow diagrams that depicts a method carried out in the management appliance to report the drift in the configuration of services running in the management appliance.

The method of FIG. 8A is triggered when a plug-in responds to a compute drift command with the computed drift. At step 810, plug-in orchestrator 230 determines if the reporting of the computed drift is set up for throttling (e.g., through a user-defined configuration). If the reporting is set up for throttling (step 810, Yes), the computed drift is stored in the drift queue. In addition, the timer for the drift queue is activated if the computed drift is added to an empty queue. On the other hand, if the reporting is not to be throttled (step 810, No), plug-in orchestrator 230 immediately streams the computed drift to configuration agent 140 through streaming API 215. Thereafter, configuration agent 140 reports the computed drift to configuration service 110 running in cloud platform 12 through a message fabric that includes a message broker agent 150 and a message broker service 120.

Figure 8B:
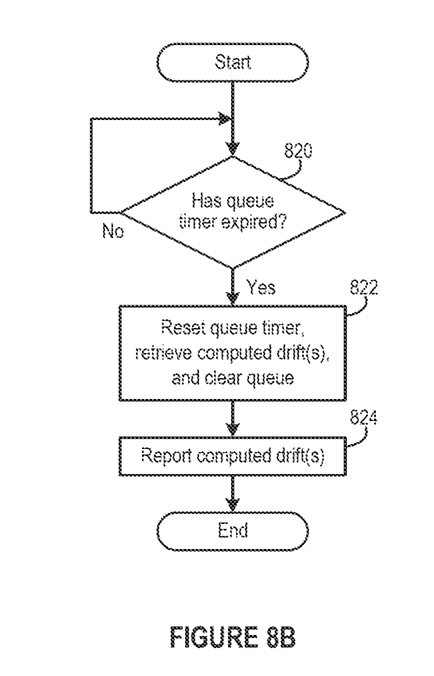

The method of FIG. 8B is triggered when the timer of the drift queue expires, which is determined at step 820. Upon expiration of the timer, plug-in orchestrator 230 at step 830 resets the timer, retrieves the computed drift(s) stored in the drift queue, and clears the drift queue. Then, at step 840, plug-in orchestrator 230 streams the computed drift(s) to configuration agent 140 through streaming API 215. Thereafter, configuration agent 140 reports the computed drift(s) to configuration service 110 running in cloud platform 12 through a message fabric that includes a message broker agent 150 and a message broker service 120.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of automatically detecting drift from a desired state in configuration of services running in a management appliance of a software-defined data center (SDDC), wherein the services include a first service that is enabled for proactive drift detection and a second service that is enabled for passive drift detection, and the desired state is managed centrally for a plurality of SDDCs from a desired state management service running in a cloud platform and communicated to the management appliance, said method comprising:

storing, by the management appliance, the desired state communicated from the desired state management service;

detecting, by the first service, a change in a configuration of the first service and issuing a notification, by the first service, to a profile service of the management appliance of the change in the configuration of the first service;

in response to the notification of the change in the configuration of the first service, computing, by the profile service, drift in the configuration of the first service from the stored desired state using a plug-in of the first service;

periodically, at designated time intervals, acquiring, by the profile service, a current state of the configuration of the second service, and computing, by the profile service, drift in the configuration of the second service from the stored desired state using a to the plug-in of the second service; and notifying the desired state management service running in the cloud platform of the computed drift in the configuration of the first and second services.

2. The method of claim 1, further comprising:
in response to a notification of a change in a configuration of a third service, which is another one of the services running in the management appliance, storing the change in the configuration of the third service in a queue for the third service; and
transmitting a third request to compute drift in the configuration of the third service to a plug-in of the third service, the third request including the change in the configuration of the third service that has been retrieved from the queue.

3. The method of claim 2, wherein the third request is transmitted according to a predefined frequency.

4. The method of claim 3, wherein
the change in the configuration of the third service stored in the queue includes a first change that is stored in the queue at a first time and a second change that is stored in the queue at a second time that is later than the first time, and
the third request includes the second change but not the first change.

5. The method of claim 1, wherein
the change in the configuration of the first service includes a changed value of a property of the configuration of the first service, and the plug-in of the first service, compares the changed value with a value of the property in the desired state to compute the drift in the configuration of the first service.

6. The method of claim 1, wherein
the desired state management service is a cloud service running in a multi-tenant cloud platform, and the notification of the computed drift in the configuration of the first and second services is made through an agent of the cloud service.

7. The method of claim 6, wherein
the agent of the cloud service is running in an agent platform appliance which is deployed on a same cluster of hosts as the management appliance, and
the desired state is communicated from the cloud service to the management appliance through the agent of the cloud service.

8. The method of claim 6, wherein the step of notifying the desired state management service of the computed drift includes:
storing the drift in the configuration of the first service computed by the plug-in of the first service in a drift queue;
storing the drift in the configuration of the second service computed by the plug-in of the second service in the drift queue; and
upon expiration of a timer for the drift queue, streaming the computed drift in the configuration of the first and second services to the agent of the cloud service.

9. The method of claim 1, wherein
the configuration of the first service includes a plurality of first properties that are part of the desired state and a plurality of second properties that are not part of the desired state, and
the first service is configured to issue the notification of the change in the configuration of the first service in response to changes to values of the first properties and to not issue the notification of the change in the configuration of the first service in response to changes to values of the second properties.

10. A non-transitory computer readable medium comprising instructions that are executable on a processor of a computer system to carry out a method of automatically detecting drift from a desired state in configuration of services running in a management appliance of a software-defined data center (SDDC), wherein the services include a first service that is enabled for proactive drift detection and a second service that is enabled for passive drift detection, and the desired state is managed centrally for a plurality of SDDCs from a desired state management service running in a cloud platform and communicated to the management appliance, said method comprising:
storing, by the management appliance, the desired state communicated from the desired state management service;
detecting, by the first service, a change in a configuration of the first service and issuing a notification, by the first service, to a profile service of the management appliance of the change in the configuration of the first service;
in response to the notification of the change in the configuration of the first service, computing, by the profile service, drift in a plug-in of the first the configuration of the first service from the stored desired state using service;
periodically, at designated time intervals, acquiring, by the profile service, a current state of the configuration of the second service, and computing, by the profile service, drift in the configuration of the second service from the stored desired state using a plug-in of the second service; and
notifying the desired state management service running in the cloud platform of the computed drift in the configuration of the first and second services.

11. The non-transitory computer readable medium of claim 10, wherein the method further comprises:
in response to a notification of a change in a configuration of a third service, which is another one of the services running in the management appliance, storing the change in the configuration of the third service in a queue for the third service; and
transmitting a third request to compute drift in the configuration of the third service to a plug-in of the third service, the third request including the change in the configuration of the third service that has been retrieved from the queue.

12. The non-transitory computer readable medium of claim 11, wherein the third request is transmitted according to a predefined frequency.

13. The non-transitory computer readable medium of claim 12, wherein
the change in the configuration of the third service stored in the queue includes a first change that is stored in the queue at a first time and a second change that is stored in the queue at a second time that is later than the first time, and
the third request includes the second change but not the first change.

14. The non-transitory computer readable medium of claim 10, wherein
the configuration of the first service includes a plurality of first properties that are part of the desired state and a plurality of second properties that are not part of the desired state, and
the first service is configured to issue the notification of the change in the configuration of the first service in response to changes to values of the first properties and to not issue the notification of the change in the configuration of the first service in response to changes to values of the second properties.

15. A computer system comprising:
a plurality of hosts from which a management appliance for managing an a software-defined data center (SDDC) and an agent platform appliance for communicating with a cloud platform to acquire a desired state of configuration of services running in the management appliance and to report drift from the desired state, are deployed, wherein the services include a first service that is enabled for proactive drift detection and a second service that is enabled for passive drift detection and the management appliance is programmed to carry out a method of automatically detecting drift from the desired state, said method comprising:
storing, by the management appliance, the desired state communicated from the desired state management service;
detecting, by the first service, a change in a configuration of the first service and issuing a notification, by the first service, to a profile service of the management appliance of the change in the configuration of the first service;
in response to the notification of the change in the configuration of the first service, computing, by the profile service, drift in the configuration of the first service from the stored desired state using a plug-in of the first service;
periodically, at designated time intervals, acquiring, by the profile service, a current state of the configuration of the second service, and computing, by the profile service, drift in the configuration of the second service from the stored desired state using a plug-in of the second service; and
notifying the desired state management service running in the cloud platform of the computed drift in the configuration of the first and second services.

16. The computer system of claim 15, wherein the method further comprises:
in response to a notification of a change in a configuration of a third service, which is another one of the services running in the management appliance, storing the change in the configuration of the third service in a queue for the third service; and
transmitting, according to a predefined frequency, a third request to compute drift in the configuration of the third service to a plug-in of the third service, the third request including the change in the configuration of the third service that has been retrieved from the queue.

17. The computer system of claim 14, wherein
the desired state is acquired from the desired state management service through an agent of the desired state management service that is running in the agent platform appliance, and the notification of the computed drift in the configuration of the first and second services is made through the agent of the desired state management service, and
the step of notifying the desired state management service of the computed drift includes:
storing the drift in the configuration of the first service computed by the plug-in of the first service in a drift queue;
storing the drift in the configuration of the second service computed by the plug-in of the second service in the drift queue; and
upon expiration of a timer for the drift queue, streaming the computed drift in the configuration of the first and second services to the agent of the cloud service.

* * * * *